W. Fuzzard,
Felting Machine.
Reissued. July. 10. 1855.
No. 314
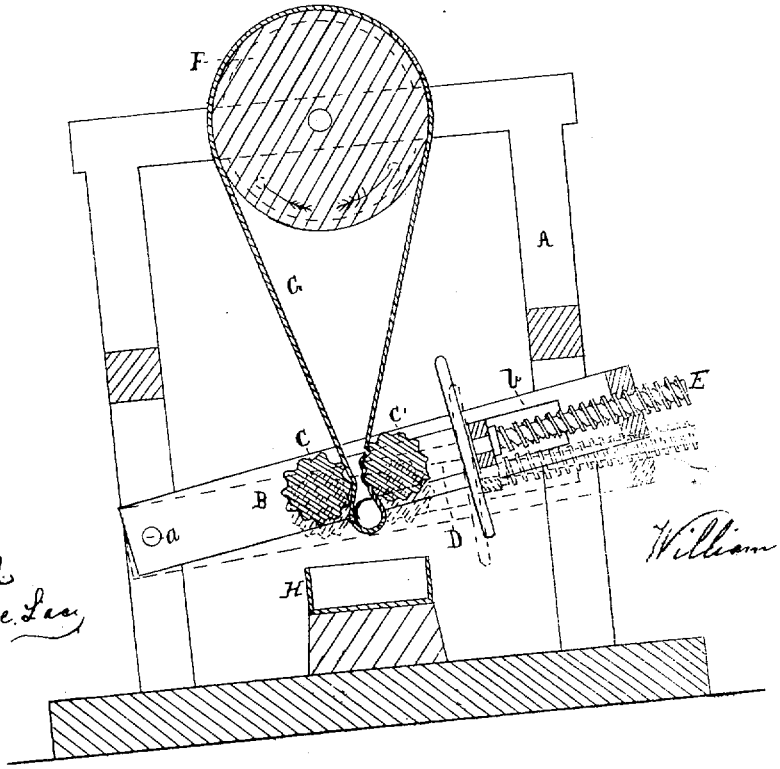
Witnesses
Wm H Pitts
Andrew De Lacy
William Fuzzard

UNITED STATES PATENT OFFICE.

WILLIAM FUZZARD, OF CHARLESTOWN, MASSACHUSETTS,

IMPROVEMENT IN MACHINERY FOR FELTING HAT-BODIES.

Specification forming part of Letters Patent No. 12,386, dated February 13, 1855; Reissue No. 314, dated July 10, 1855.

*To all whom it may concern:*

Be it known that I, WILLIAM FUZZARD, of Charlestown, in the county of Suffolk and State of Massachusetts, have invented a new and Improved Machine for Felting; and I do hereby declare that the following is a full, clear, and exact description of the same, reference being had to the annexed drawing, making a part of this specification, said drawing being a longitudinal vertical section of my said machine, the plane of section being through the center.

In my said invention the article or articles to be felted are placed within the fold of a flexible apron or belt and there confined and compressed by rollers, or other analogous device, which grip the apron or belt beyond, and so that the article or articles thus gripped can be rolled by the motion of the apron or belt and compressed with any degree of pressure required. And the principle or mode of operation of my said invention consists in giving the felting action by means of the moving apron or belt, within the fold of which the article or articles to be felted are inclosed and compressed to the extent required by the rollers or equivalent which grip the apron or belt beyond the swell produced by the article or articles to be felted.

To enable others skilled in the art to fully understand, construct, and use my invention, I will proceed to describe it.

A represents a rectangular frame, having a swinging frame, B, secured within it, one of the pivots on which the swinging frame works, being shown at *a*. The swinging frame is of rectangular form, and is provided with two corrugated rollers, C C′, placed transversely within it. The axis of the roller C works in permanent bearings in the frame B, but the axis of the roller C′ has its bearings in slide D, which work in grooves *b* in the inner surfaces of the side pieces of the frame B, the slides being operated by a screw, E, so that the roller C′ may be adjusted nearer to or farther from the roller C, as desired.

F is a drum, the axis or shaft of which runs in suitable bearings on the upper part of the frame A. The drum is placed transversely on the frame A and parallel with the rollers C C′ in the swinging frame B. Around the drum F there is an endless apron G, formed of any suitable material. This apron is of sufficient length to pass between the rollers C C′ and extend a short distance below them.

H is a trough or basin secured to the lower part of the frame A and underneath the rollers C C′, the length of the trough or basin corresponding with that of the rollers.

Operation: The roller C′ is first moved a suitable distance from the roller C by operating the screw E, and the hat-bodies to be felted are rolled up by hand a suitable number together, and placed in the fold at the lower part of the endless apron G. The roller C′ is then moved near the roller C, and a rotary reciprocating motion is given the drum F by hand or otherwise, and the hat-bodies receive a similar motion to and with the apron G underneath the rollers C C′, and the requisite pressure is given to the hat-bodies against the rollers by depressing or bearing with the hand upon the outer end of the swinging frame B.

The advantage of the above invention is, that the pressure of the rollers upon the hat-bodies may be graduated with the greatest nicety. This is important, for the hat-bodies, when first acted upon, or when first put in the machine, are extremely tender and liable to be ruptured. By my improved machine a very slight pressure may be first given them, and precisely similar to that of hand-pressure. After the bodies are somewhat felted and have sufficient strength, the pressure may be increased by depressing the swinging frame still more, and a continuous rotary motion may be given the drum F.

The hat-bodies are moistened, as usual, before being operated upon by the machine, and the trough or basin H receives the moisture expressed from them by the pressure of the rollers C C′.

I am aware that rollers and aprons or belts have been used in machinery for felting, but not under an organization having a mode of operation analogous to the machine above described, and therefore I do not wish to be understood as making claim, broadly, to the use of rollers, or rollers and an apron, except under an organization substantially such as above described and resulting in the mode of operation herein specified.

What I do claim as my invention, and desire to secure by Letters Patent, is—

Giving the felting action by means of the moving apron, arranged substantially as specified, to receive the article or articles to be felted within the fold thereof, and there confined and compressed by the rollers, or their equivalent, acting on the apron and resulting in a mode of operation substantially as described.

WILLIAM FUZZARD.

Witnesses:

WM. H. BISHOP,

ANDREW DE LACY.